United States Patent [19]

Stewart

[11] E Patent Number: Re. 33,554

[45] Reissued Date of Patent: Mar. 19, 1991

[54] TOILETS

[75] Inventor: John M. Stewart, River Drive Park, Canada

[73] Assignee: Sanitation Equipment Limited, Concord, Canada

[21] Appl. No.: 471,569

[22] Filed: Jan. 29, 1990

Related U.S. Patent Documents

Reissue of:

[64] Patent No.: 4,817,215
Issued: Apr. 4, 1989
Appl. No.: 944,025
Filed: Dec. 22, 1986

[51] Int. Cl.[5] ..... A47K 13/12

[52] U.S. Cl. ..... 4/236; 16/341; 16/342

[58] Field of Search ..... 4/236, 240; 16/341, 16/342, 334; 220/335

[56] References Cited

U.S. PATENT DOCUMENTS

| | | | |
|---|---|---|---|
| 1,207,270 | 12/1916 | Braithwaite | 4/236 |
| 2,026,024 | 12/1935 | Dullere | 4/236 |
| 3,000,049 | 9/1961 | Terry, Jr. | 16/334 |
| 4,091,475 | 5/1978 | Hewson et al. | 4/321 |
| 4,186,905 | 2/1980 | Brudy | 16/342 |
| 4,439,875 | 4/1984 | Stewart et al. | 4/321 |
| 4,564,943 | 1/1986 | Bergmark | 4/610 |
| 4,589,148 | 5/1986 | Cameron | 4/240 |

*Primary Examiner*—Linda J. Sholl
*Attorney, Agent, or Firm*—Rogers, Bereskin & Parr

[57] ABSTRACT

A hinge arrangement for the lid and seat of a toilet is disclosed. Hinge pins extend outwardly from lugs on a bowl unit of the toilet through corresponding openings in flanges on the seat and lid and are provided with cam surfaces co-operating with corresponding surfaces on the lid. The co-operating cam surfaces generate frictional forces when the lid is raised so that the lid will tend to stay in a position to which it has been raised. The cam surfaces also define open and closed detent positions in which the lid is positively retained. The seat can be hinged freely when the lid is raised and is trapped against the bowl unit when the lid is closed.

9 Claims, 3 Drawing Sheets

TOILETS

Matter enclosed in heavy brackets [ ] appears in the original patent but forms no part of this reissue specification; matter printed in italics indicates the additions made by reissue.

FIELD OF THE INVENTION

This invention relates generally to toilets and is concerned more particularly with a hinge arrangement for the lid and/or seat of a toilet.

BACKGROUND OF THE INVENTION

Virtually all toilets have a bowl unit including a bowl, and a cover or lid which is hinged to the bowl unit for movement between a normal closed position in which the bowl is concealed by the lid, and a raised position in which the toilet can be used. Often, a separate seat is also hinged to the bowl unit inside the lid so that it too can be raised and lowered (when the lid is up).

In the case of a domestic-type toilet designed to be permanently installed in a residence, the bowl unit is normally made of vitreous china and is designed to be bolted to a floor-mounted waste outlet flange. A lid and seat, typically of plastic, are held in place by hinges that bolt to the china bowl unit rearwardly of the bowl opening. Toilets for recreational vehicles and portable toilets also usually have a hinged lid and seat. Typically, the bowl unit is a plastic moulding with integrally formed lugs behind the toilet bowl opening to which the lid and seat are coupled by hinge pins. In a portable toilet, the bowl unit will normally be a separate portable unit supported on and coupled to a holding tank when the toilet is in use. Reference may be made to U.S. Pat. Nos. 4,091,475 and 4,439,875, both assigned to Sanitation Equipment Limited for descriptions of known portable toilets.

In all of these types of toilet, the lid and seat are generally hinged to the toilet bowl by hinge pins that allow substantially free hinging movement of the lid and seat. If the lid is raised, it will generally not stay in a raised position but must be either held open or pivoted right back until it rests against other structure of a stop forming part of the hinge. The fact that the lid and seat are hinged freely is a significant disadvantage in the case of a portable toilet, since the lid and/or seat may tend to swing out from the bowl unit when the toilet is carried or transported. Where the toilet is installed in a recreational vehicle, this can make for annoying rattling or chattering of the lid when the vehicle is in motion. U.S. Pat. No. 4,589,148—assigned to Thetford Corporation discloses a toilet hinge in which the hinge pin is restrained by resilient fingers; however, the patented arrangement is apparently designed to allow the hinge pin to float vertically rather than to control hinging movement.

An object of the present invention is to provide an improved hinge arrangement for the lid and/or seat of a toilet.

SUMMARY OF THE INVENTION

The invention provides a toilet having a bowl unit including a bowl, at least one of a seat member and a lid member, and hinge means coupling the member to the bowl unit and defining a hinge axis permitting movement of the member between raised and lowered positions with respect to the bowl. Cam means are provided on the member and bowl unit adjacent said axis and are positioned to co-act with one another as the member is moved between its raised and lowered positions, and are arranged to generate frictional forces inhibiting free movement of the hinge means about the said axis so that the lid/seat member will tend to remain in a raised position to which it has been moved. The hinge means comprises first and second hinge pins disposed in positions spaced along said axis and each extending betweeen a lug on the bowl unit and respective co-operating flanges o the lid or seat member Each pin is fixed against turning with respect to one of the lug and flange. The cam means comprises, in association with each hinge pin, co-operating lug and flange and second cam surfaces integrally formed on the pin. The flanges on the lid or seat member are disposed outwardly of the lug means on the bowl unit and the cam surfaces are shaped to cause portions of the flanges adjacent the pins to be forced outwardly as the cam surfaces co-act upon movement of the lid or seat member between its raised and lowered positions, porducing tension stresses in the lid that tend to urge the cam surfaces toward one another and generate said frictional forces inhibiting free movement of the hinge movement.

Preferably, the cam means provides at least one detent location corresponding to a fully open or a fully closed position of the lid or seat member for retaining the member in that position. Ideally, the cam means should provide detent locations at both fully closed and fully open positions so that the lid/seat member is positively retained in both of those positions.

In the case of a toilet having both a hinged lid and a hinged seat, it will generally be sufficient if the cam means is designed to act between the bowl unit and the lid and the seat is arranged so that it is trapped between the lid and bowl unit when the lid is closed. However, it would be possible to provide cam means between both the bowl unit and seat and between the bowl unit and lid.

BRIEF DESCRIPTION OF THE DRAWINGS

In order that the invention may be more clearly understood, reference will now be made to the accompanying drawings which illustrate a particular preferred embodiment of the invention by way of example, and in which.

DESCRIPTION OF THE PREFERRED EMBODIMENTS

Figure 1:
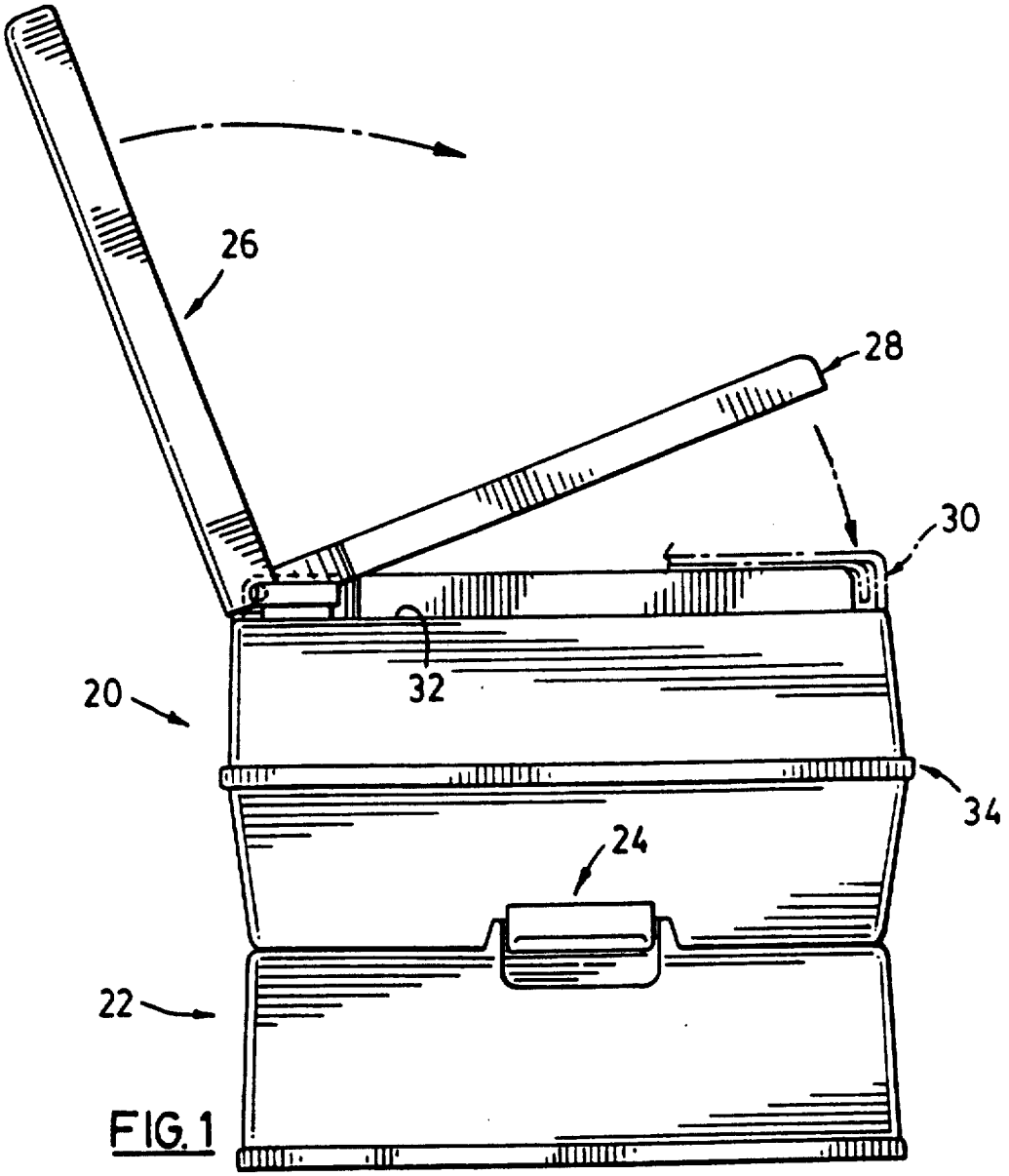
FIG. 1 is a side elevational view of a portable toilet having a hinge arrangement in accordance with the invention, shown with the lid open and the seat partially raised.

Referring first to FIG. 1, a portable toilet is shown generally to comprise a bowl unit 20 seated on a holding ank 22. The bowl unit and holding tank are coupled ogether by latches at opposite sides, one of which is hown generally at 24. Specific details of the bowl unit nd holding tank have not been shown apart from the iinge arrangement to be described, since they form no part of the present invention. Reference may be made to he U.S. Pat. No. 4,439,875 for such details. The disclo-ure of this patent is incorporated herein by reference.

FIG. 1 generally illustrates the fact that the bowl unit 10 is provided with a separate lid 26 and seat 28 that can be raised and lowered as indicated by the arrows. The id is shown in a fully open position, while seat 28 is shown partly open. Portions of both the seat and lid are shown in ghost outline at the location generally indicated by reference numeral 30 to illustrate the fact that the lid 26 is designed to enclose and trap the seat 28 against the bowl unit when the lid is in its closed position. A this time, the lid rests on a ledge 32 around the perimeter of the bowl unit and lies generally flush with the sides of the unit, for neatness of appearance.

Figure 2:
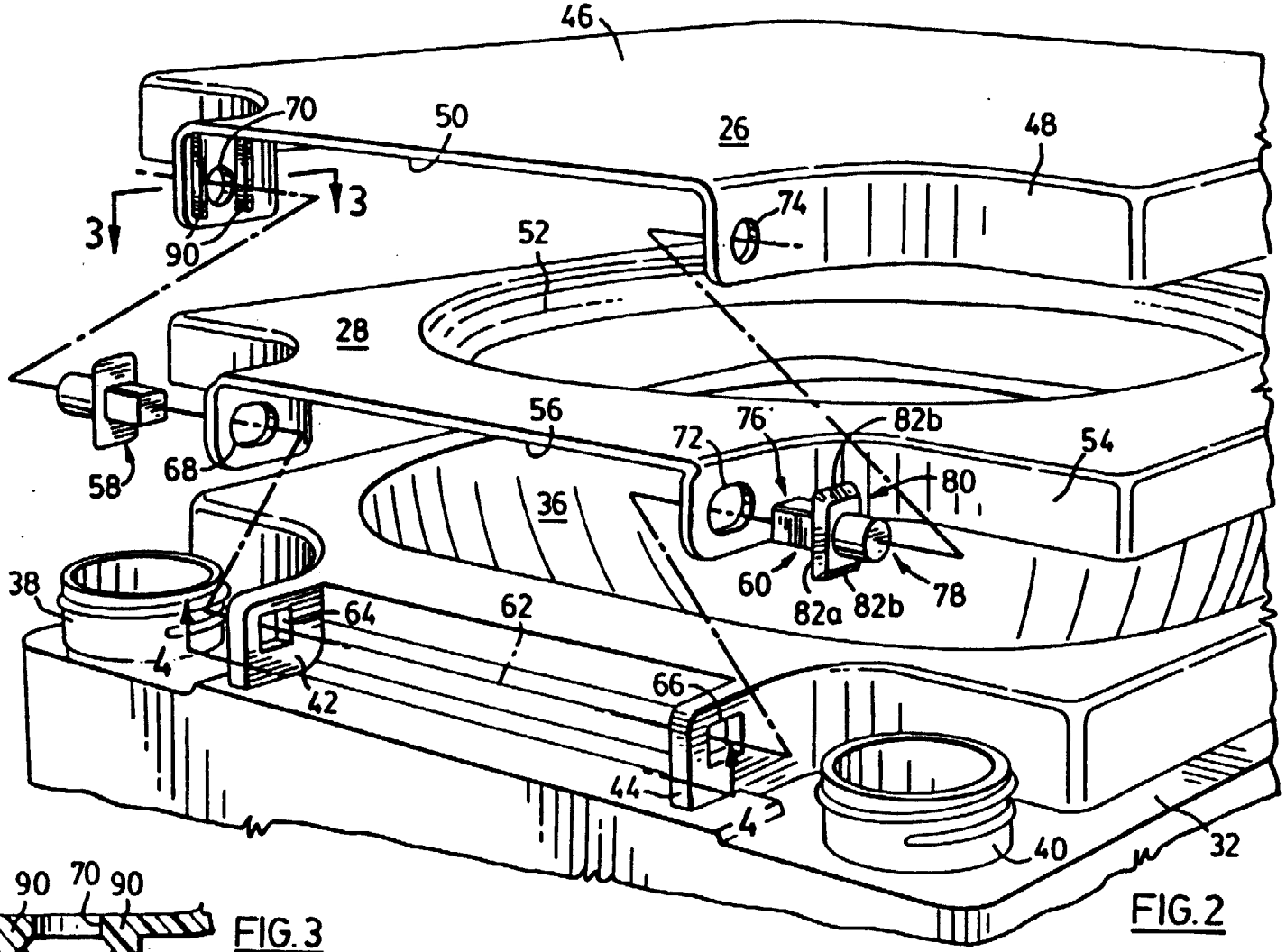
FIG. 2 is an exploded rear perspective view of the hinge arrangement of the toilet shown in FIG. 1.

FIG. 2 shows the contour of the top of the bowl unit in somewhat more detail, including the ledge 32. The bowl unit is made up of two plastic moulded shells joined together at a seam visible at 34 in FIG. 1. The moulding that forms the upper shell includes the actual bowl of the toilet (which is indicated at 36 in FIG. 2) as well as necks 38 and 40 for providing access to a flush water reservoir (not illustrated) within the bowl unit; one of the necks is used for filling and the other receives a pump for dispensing flush water. Again, these elements form no part of the present invention and are therefore not described in detail. The moulding also includes two spaced lugs 42 and 44 for the lid and seat hinge.

Lid 26 and seat 28 are also plastic mouldings. The lid has a generally planar top 46 surrounded by a flange 48 which is interrupted across the back of the seat by a gap indicated at 50. Seat 28 is of generally similar form except that it of course has a central opening 52 and is smoothly contoured to provide a comfortable seating surface. Seat 28 also has a depending flange 54 which is similar to flange 48 and which is also interrupted by a gap 56 at the rear of the seat. The seat and lid are dimensioned relative to the spacing between the two lugs 42 and 44 on the bowl unit so that the seat will fit relatively snugly over the lugs 42, 44 and the lid will then fit snugly over the seat. Portions of the respective seat and lid flanges 54, 48 on opposite sides of respective gaps 56, 50 form parts of the lid/seat hinge arrangement.

Two hinge pins 58, 60 are provided for coupling together the lid, seat and lugs 42, 44 on a hinge axis denoted 62. The respective pins are designed to fit into square openings 64, 66 in the respective lugs and to extend outwardly from those lugs through corresponding rounded openings 68, 70 and 72, 74 in the seat and lid respectively.

Referring to hinge pin 60 by way of example, it will be seen that the pin has first and second end portions 76 and 78 and an intermediate portion 80 providing cam surfaces 82 as will be described. The first end portion 76 of pin 60 is of square shape in cross-section and the corresponding opening 66 in the lug 44 on the bowl unit is of complimentary shape. When the hinge is assembled, the square end portion 76 of the hinge pin also extends through the hinge opening 72 in the seat; the opening is dimensioned to provide sufficient clearance that the seat can be raised and lowered freely about the pin, while limiting undue free play. The second or outer end portion 78 of hinge pin 60 is cylindrical and fits into the opening 74 in the lid, which is of complimentary circular shape. In the assembled condition, therefore, the intermediate portion 80 of the hinge pin is disposed between the flange 48 on the lid and the flange 54 on the seat.

In the assembled hinge, pin 60 is therefore held against turning with respect to the lug 44 on the bowl unit but both the seat and lid can turn with respect to the pin. The other hinge pin 58 is essentially identical and is installed in similar fashion.

Figure 6:
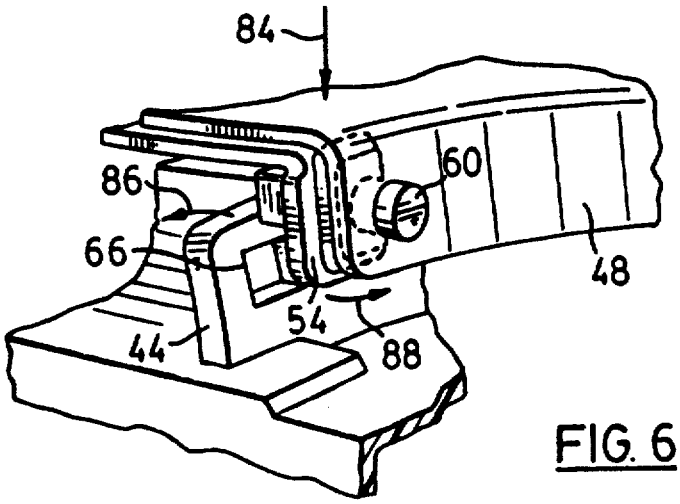
FIG. 6 is a detail perspective view illustrating assembly of the hinge arrangement.

FIG. 6 in fact illustrates the manner of installing the hinge pins. Each pin is first fitted between the seat and lid. One of the two hinge pins will be installed by simply fitting one end portion of the pin through the relevant opening in, say, the lid and then fitting the seat opening over the other end portion of the pin. The other pin will then be forced into place by distorting the respective flanges 48, 54 apart sufficiently to allow the pin to snap into place. As noted previously, the lid and seat are made of a plastic material having sufficient flexibility to permit adequate distortion without damage. Having installed the two pins between the seat and pin, the square end portion of one of the pins will then be fitted inwardly into the relevant one of the two lugs 42, 44 on the bowl unit. The other pin (illustrated as pin 60 in FIG. 6) will then be positioned so that the end face of its squared end portion 76 is above the opening 66 in lug 44. The seat/lid assembly will then be forced downwardly as indicated by the arrow 84 in FIG. 6 so that the lug will deflect inwardly as indicated at 86 and the two flanges 54 and 48 will deflect outwardly as indicated at 88 to an extent sufficient to permit the squared end portion of the pin to snap into the opening 66.

Figure 4:
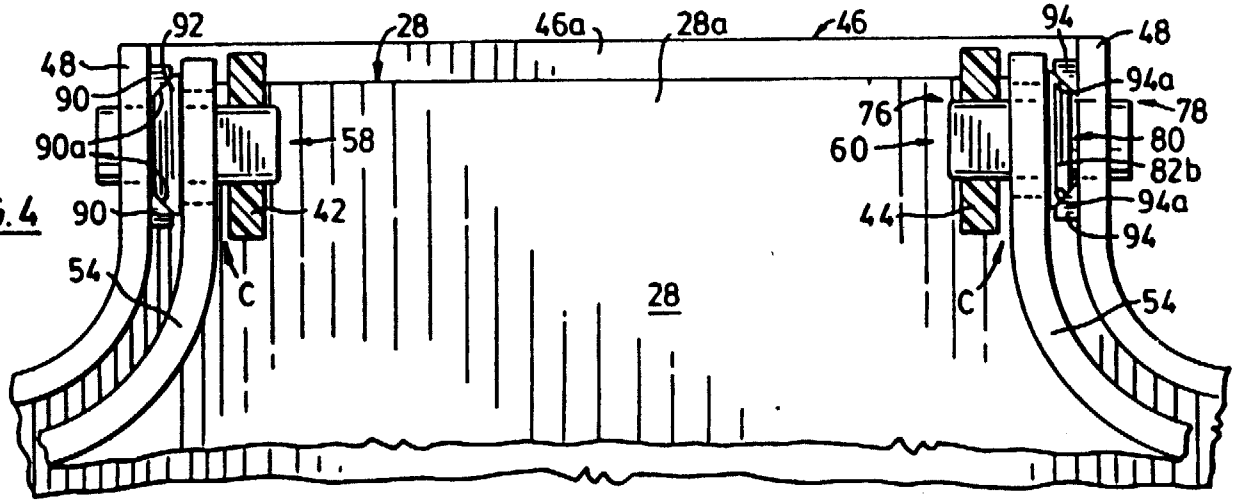
FIG. 4 is a sectional view on line 4—4 of FIG. 2, in the assembled condition and with the toilet lid and seat closed.
Figure 5:
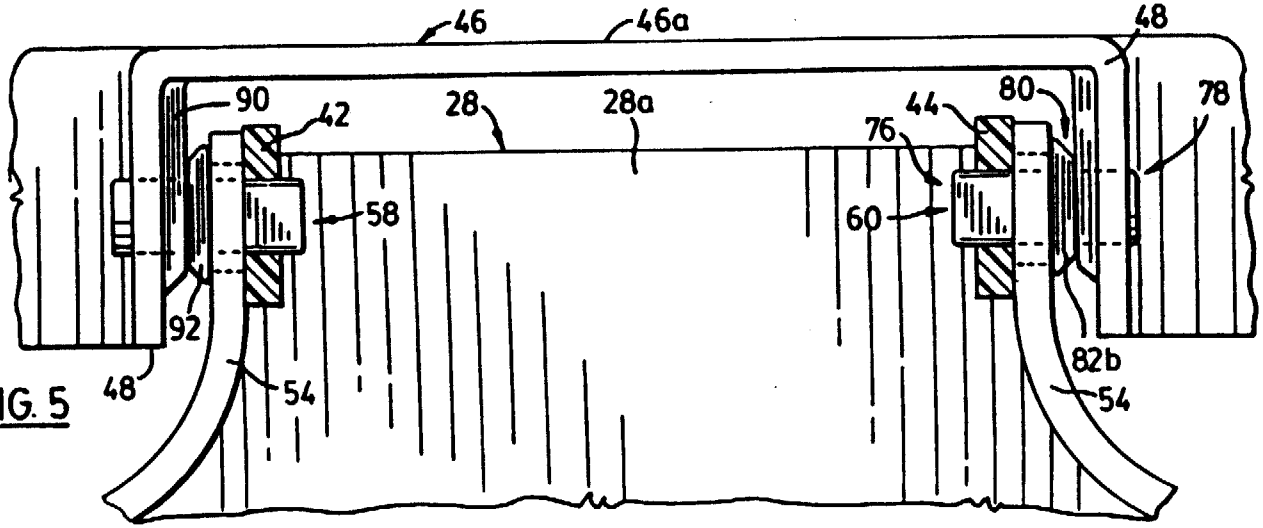
FIG. 5 is a view similar to FIG. 4 but showing the lid open.

FIGS. 4 and 5 are sectional views showing both pins installed and with the lid respectively in the closed and open positions.

Referring back to FIG. 2, it will be seen that the cam surfaces 82 on the intermediate portion 80 of pin 60 comprise two pairs of surfaces with the surfaces in each pair parallel to one another and at right angles to the surfaces in the other pair (i.e. in a generally square configuration). In FIG. 2, the surfaces in one pair are denoted 82a while the surfaces in the other pair are denoted 82b. As can be seen in FIGS. 4 and 5, the surfaces are chamfered or inclined inwardly towards one another in a direction of the outer end portion 78 of the pin.

Figure 3:
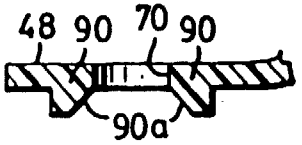
FIG. 3 is a detail sectional view on line 3—3 of FIG. 2.

Corresponding cam surfaces are provided on the inside surface of the lid flange 48 adjacent the respective openings 70 and 74 in the flange. In FIG. 2, the cam surfaces adjacent opening 70 can be seen; similar surfaces are provided adjacent opening 74 but are not visible in that view. The cam surfaces adjacent opening 70 are formed on a pair of ribs 90 that extend parallel to one another on opposite sides of the opening and generally at right angles to the top 46 of the toilet lid. The ribs 90 are shown in section in FIG. 3 and the cam surfaces defined by the respective ribs are denoted 90a. These surfaces are chamfered or inclined in the same direction as the cam surfaces on the associated pin (in this case pin 58) as can be seen in FIG. 4. In that view, the cam surfaces on pin 58 are denoted by reference numeral 92 and are identical with the cam surfaces on pin 60. The cam surfaces adjacent the openings 74 in the lid flange 48 are also visible in FIG. 4 and are shown as surfaces 94a of ribs 94. Again, the ribs are identical with the ribs 90.

With continued reference to FIG. 4, it will be appreciated that, if the lid 26 is raised, the cams formed by the ribs 90, 92 will turn with respect to the stationary cams on the hinge pins and the respective cams in each set will be forced apart as shown in FIG. 5. This will create tension in the portion of the top of the lid between the opening 74 (denoted 46a in FIG. 5) and compression in the corresponding portion of the seat (28a). These tension and compression forces will result in opposing forces at the cam faces that are in contact, resulting in frictional forces inhibiting free movement of the lid 46 about the hinge axis 62. This means that the lid will tend to stay in a position to which it is raised. From a comparison of FIGS. 4 and 5 it will be seen that in the closed position of the lid and seat (FIG. 4) clearance C exists between the lugs 42, 44 and the seat, and that this clearance disappears as the lid is inwardly compressed by raising the seat.

The square configuration of the cam surfaces on the hinge pins coupled with the corresponding parallel cam surfaces on the lid means that the cams also define positive detent positions for firmly locating the lid in both its closed position and in a raised position at 90° to the closed position. For example, in the closed position of FIG. 4 (in FIG. 2) the respective lid and seat portions 46a and 28a are relatively unstressed and the cam surfaces are in a first detent position with the two vertical ribs inside the lid lying snugly on the corresponding vertical cam surfaces on the pins (as surfaces 82a of pin 60). The pins are designed so that the lid is held firmly closed at this time and will not "chatter" if the toilet is subjected to vibration. An attempt to lift the lid 46 will encounter resistance as the cam surfaces inside the lid turn and attempt to "climb over" the corners of the cam surfaces on the pins. Once that resistance has been overcome, the cam surfaces will be forced to part as discussed previously until the cam surfaces in the lid have become substantially horizontal and snap over onto the other (horizontal) cam surfaces on the pins (as the surfaces 82b in the case of pin 60). This is the other detent position. Again, significant resistance will be encountered in attempting to pivot the lid from that position because the cam surfaces in the lid will again have to "climb over" the corners of the cam surfaces on the pins.

In summary, the hinge arrangement disclosed provides for positive location of the lid in the closed position and in an open position. At the same time, the cam surfaces are designed to generate frictional forces that will hold the lid in the raised position between its extreme positions.

It will of course be understood that the preceding description relates a particular preferred embodiment of the invention only and that many modifications are possible within the broad scope of the invention. For example, even though the preceding description relates specifically to a portable toilet there is no limitation in this respect. A similar hinge arrangement could be used on any type of toilet. In the case of a permanent domestic-type toilet, the lugs 42, 44 on the bowl unit could be replaced by separate components that would bolt to the bowl unit in the manner of conventional lid hinges.

The cam arrangement could be used between a bowl unit and lid as described, between a bowl unit and seat or between a bowl unit and both the seat and lid. In the latter case, additional cam surfaces would be provided between the seat and lugs 42, 44 in the described embodiment. The cams may be separate from the hinge pins and could, for example, take the form of formations moulded integrally into the components of the toilet (where plastic components are employed). For example, cam surfaces could be provided between the opposed portions of the flanges on the lid and seat and between the opposed portions of the flange on the seat and the exterior surface of the lugs on the bowl unit.

Referring back to the specific embodiment illustrated, the hinge pins could be fixed with respect to the lid and turn in openings in the bowl unit, i.e. the reverse of the arrangement illustrated.

I claim:

1. A toilet having a bowl unit including a bowl, at least one of seat member and a lid member, hinge means coupling side member to the bowl unit and defining a hinge axis permitting movement of the member between raised and lowered positions with respect to the bowl, and cam means arranged to co-act as the said member is moved between its said raised and lowered positions and generate frictional forces inhibiting free movement of the hinge means about said axis so that said member will tend to remain in a raised position to which it has been moved, wherein said hinge means comprises first and second hinge pins disposed in positions spaced along said axis and each extending between a lug on the bowl unit and a co-operating flange on said lid or seat member, each said pin being fixed against turning with respect to one of the lug and flange, and wherein said cam means comprises, in association with each said hinge pin, first cam surfaces formed on the other of said lug and flange and second cam surfaces on said pin, said flanges on the lid or seat membe being disposed outwardly of the lugs on the bowl unit and the cam surfaces being shaped to cause portions of said flanges adjacent the pins to be forced outwardly as said cam surfaces co-act upon movement of said lid or seat member between its said raised and lowered positions, producing tension stresses in said lid or seat memer that tend to urge said cam surfaces toward one another and generate said frictional forces inhibiting free movement of the hinge means.

2. A toilet as claimed in claim 1, wherein said cam means are shaped to provide at least one detent location corresponding to one of a fully open or a fully closed position of the lid or seat memer for positively retaining the member in said position.

3. A toilet as claimed in claim 1, wherein said second cam surfaces formed on said pin comprise two pairs of cam surfaces with the surfaces in each pair parallel to one another and at right angles to the surfaces of the other pair, and wherein said first cam surfaces comprise a pair of parallel cam surfaces adapted to co-operate with either of the pairs of cam surfaces on the pin, whereby said cam means define two detent locations substantially at right angles to one another, one of said locations corresponding to a fully closed position of said lid or seat member and the other detent location corresponding to a fully open position of said lid or seat member.

4. A toilet as claimed in claim 3, wherein wach said pin is a separate component having first and second end portions and an intermediate portion defining said cam surfaces, said end portions being received in respective openings in the relevant co-operating lug and flange, one said end portion and the opening in which it is received being circular while the other end portion and opening are non-circular for retaining the pin against turning.

5. A toilet as claimed in claim 1, having both a seat member and a lid member coupled to the bowl unit by said hinge means with the seat member inwardly of the lid member, wherein said hinge pins extend outwardly from said lug means through corresponding openings in respective flanges on the lid and seat members, each said pin being fixed against turning with respect to said lug while permitting turning of the seat member and lid member with respect to said pins, and wherein said first cam surfaces are formed on said flange of the lid.

*6. A toilet having a bowl unit including a bowl, at least one of a seat member and a lid member, hinge means coupling said member to the bowl unit and defining a hinge axis permitting movement of the member between raised and lowered positions with respect to the bowl, and cam means arranged to co-act as the said member is moved between its said raised and lowered positions, wherein said hinge means comprises first and second hinge pins disposed in positions spaced along said axis and each extending between a lug on the bowl unit and a co-operating flange on said lid or seat member, each said pin being fixed against turning with respect to one of the lug and flange, and wherein said cam means comprises, in association with each said hinge pin, a first pair of parallel cam surfaces formed on the other of said lug and flange and a second pair of parallel cam surfaces on said pin, said first and second pairs of cam surfaces being arranged to lie mutually parallel and provide a detent location when said lid or seat member is in its said lowered position, whereby said member is positively retained in said lowered position.*

*7. A toilet as claimed in claim 6, wherein the flanges on the lid or seat member are disposed outwardly of the lugs on the bowl unit and wherein said cam surfaces are shaped to cause portions of said flanges adjacent the pins to be forced outwardly as said cam surfaces co-act upon movement of said lid or seat member between its said raised and lowered positions, producing tension stresses in said lid or seat member that tend to urge said cam surfaces toward one another.*

*8. A toilet as claimed in claim 6, wherein each said pin is a separate component having first and second end portions and an intermediate portion defining said second cam surfaces, said end portions being received in respective openings in the relevant co-operating lug and flange, one said end portion and the opening in which it is received being circular while the other end portion and opening are non-circular for retaining the pin against turning.*

*9. A toilet as claimed in claim 6, having both a seat member and a lid member coupled to the bowl unit by said hinge means with the seat member inwardly of the lid member, wherein said hinge pins extend outwardly from said lugs through corresponding openings in respective said flanges on the lid and seat members, each said pin being fixed against turning with respect to said lug while permitting turning of the seat member and lid member with respect to said pins, and wherein said first cam surfaces are formed on said flanges of the lid.*

* * * * *